Jan 6, 1931.   K. STROBEL   1,787,600
METHOD OF AND APPARATUS FOR ARC WELDING
Filed Jan. 21, 1928
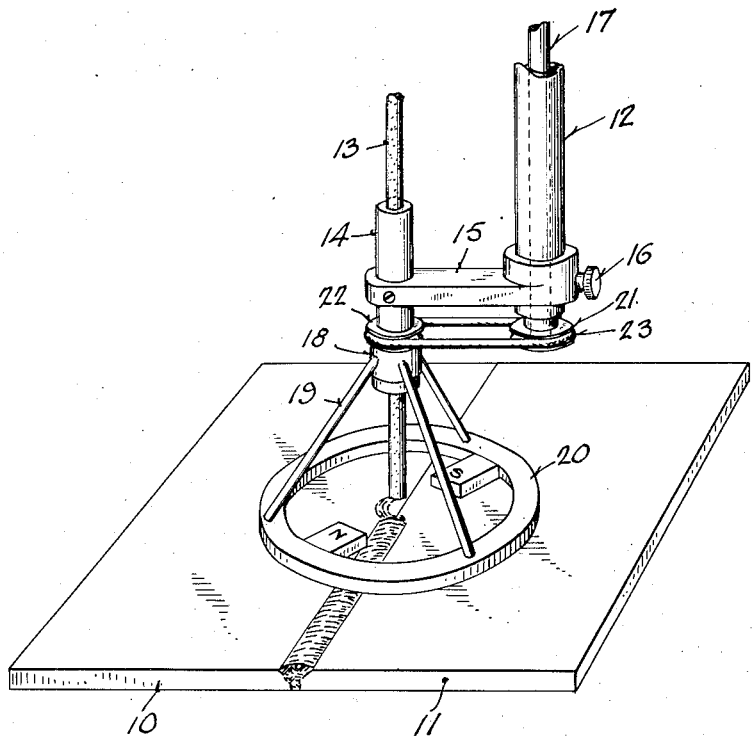
WITNESS:
INVENTOR.
KARL STROBEL
BY
ATTORNEY.

Patented Jan. 6, 1931

1,787,600

UNITED STATES PATENT OFFICE

KARL STROBEL, OF MILWAUKEE, WISCONSIN, ASSIGNOR TO A. O. SMITH CORPORATION, OF MILWAUKEE, WISCONSIN, A CORPORATION OF NEW YORK

METHOD OF AND APPARATUS FOR ARC WELDING

Application filed January 21, 1928. Serial No. 248,367.

The invention set forth in this specification and shown in the accompanying drawing, relates to the art of electric arc welding. Preferably and conveniently it is employed in the practice of metallic arc welding, but it is also capable of use with equally satisfactory results in carbon arc welding. The fundamental feature of the invention resides in a novel method and means permitting, among other results achieved, the control of the electric arc, whereby the zone of its operation is enlarged, and it is not material in the practice of the invention that one type of electric arc welding be employed to the exclusion of the other, excepting as the circumstances attending its use in some particular instance may render one more desirable than the other. The invention, however, will be described as a metallic arc operation, with the understanding that its use is not to be limited to the connection stated.

In ordinary methods of metallic arc welding, such as are generally used in welding with an arc moving in a right line, the longitudinal path of traverse of the arc is narrow, when viewed in its lateral dimensions. In practicing such older process, an extreme heat concentration under the arc occurs at the meeting line of the parts to be welded. The edges of thin metal plates to be welded, may quickly be brought to a welding state, by this old practice. But with an increase in the thickness of the plates to be joined, a different situation arises. It is difficult to secure a proper heat penetration in thick plates, without injuring the surface of the metal, when the heat of the arc is concentrated. The surface stratum of the metal volatilizes rapidly under the heat of the arc, and consequently the latter can be maintained at one point for an instant only.

My new method contemplates the diversion and spreading of the electric arc over a much wider path, so that the heat concentration at given points in the line of the weld is distributed over an area of rotation rather than being concentrated upon a single point. The arc is formed in a magnetic field, and by magnetic action is blown or drawn laterally at a right angle to the line of its formation, and with the shifting of the field is caused to rotate continuously through a circle. This practice permits the gradual rather than instantaneous heating to their full depth of the adjacent edges of the thick metal parts to be welded, and effects a welded joint in which the metal at the surface of the welded parts is not injured by the concentration of the intense heat of the arc, as in the older methods.

In arc welding as ordinarily practiced, it is difficult to prevent the inclusion of impurities in the weld, and the presence of such defects detracts from the value of the joint. But in my invention, the circular sweep of the diverted arc in the cycles of its rotation tends to agitate the molten metal resulting in a puddling effect which acts effectively to scavenge the welded joint and remove impurities therefrom and prevent detrimental occlusions.

Having thus outlined the nature and characteristics of my invention, I will now describe a specific application of the same in connection with the accompanying drawing, and then point out the novelty in the appended claims.

The accompanying drawing is a perspective view of one form of a simple apparatus embodying my invention, and by means of which the novel process of diverting and spreading the electric arc over a wider path during the operation of welding may be effected.

In the drawing, the numerals 10 and 11 indicate two thick metal plates, the squared, abutting edges of which are to be welded on their meeting line. Usually, the meeting edges of such thick plates are chamfered so as to form a narrow and deep groove, with parallel or substantially parallel side walls, to facilitate arc welding, in a manner now well known in the art. But the present invention eliminates the necessity for the provision of such a groove in many cases.

A post 12 depends from the usual welding head, which latter comprises means responsive to variations in the welding current for automatically controlling the rate of the forward feeding movement of the metallic weldrod 13, or welding wire, at the point of which the arc is formed. The free end of the weldrod 13 is guided by a tubular eye piece 14, carried at the outer end of an arm 15, the other end of the latter being bored to embrace the post 12, and adjustable both axially and radially thereon, by means of a set screw 16, threaded into a perforation in the arm, and bearing with its point against the post 12.

In the construction illustrated, the post 12 is of tubular formation, and provides a bearing for a vertical shaft 17, arranged therein. The shaft 17 is rotated by connections from the driving means for effecting the longitudinal travel of the welding head, or by any other means which will impart the desired rotation to the said shaft.

A hub 18 is arranged for free rotation upon the lower end of the eye piece 14. Diverging arms 19, in plural number, extend downwardly from the hub, and support at their lower ends, an annular body 20 of iron, with pole pieces N and S of steel, constituted as a permanent magnet, and arranged diametrically of the annular body. The latter lies preferably in the plane of the arc, and is concentric with respect to the axis of the weldrod. The spider composed of the elements 18, 19 and 20, and the magnetic pole pieces, should be constructed in a state of equilibrium, so as to permit its free rotation without vibration.

The lower end of the shaft 17 is provided with a grooved pulley 21, and the hub 18 of the spider is correspondingly provided with a curcumferential groove, as at 22, the grooves being aligned in the same plane, as shown. A belt or chain 23, is looped at one end in the groove of pulley 21, and at the other in the groove 22 of the hub 18, so that the movements of rotation of the shaft 17 are transmitted to the hub 18 and to the magnet 20. The magnet 20 may be rotated in either direction.

In the operation of the apparatus illustrated, the arc is struck at the point of the weldrod 13, and a flow of the welding current is established. The weldrod feeding devices then begin their movement, and the magnet 20, through the connections before described, rotates around the arc, constantly changing the direction of the magnetic field into which the arc extends. The arc, in following the magnetic field, is diverted laterally from the axis of the weldrod, and consequently the path of its travel along the weldrod line is correspondingly widened.

In each cycle of rotation of the arc, the heat of the arc is applied successively to areas of the metal within the circle traversed. In this manner, the extreme concentration of heat, incident to the practice of the older method of maintaining the position of the arc at one point until penetration is complete, and the lower stratum of the metal brought to a welding temperature, is obviated, and the attendant liability of burning the surface of the metal, is avoided.

The arc in traveling over a circular path on the surface of the metal being welded tends to agitate the molten metal so as to cause a puddling of the same, which acts effectively to scavenge the welded joint and free the same from all impurities and occlusions.

In my approved method, the gradual transfer of the heat to the areas to be welded, by successive applications in the cycle of rotation of the arc, effects a complete penetration of the thick metal, and the production therein of a welding temperature, without injury to the surface of the metal. Moreover, the welded joint thus produced is ascertained to be of a more uniform structure, entirely free from blowholes or other defects, and of superior quality, as the tests applied have fully established.

Instead of a rotating permanent magnet, a rotating electro-magnet may be employed. The purposes of my invention may be achieved by imparting a reciprocating rotary motion, instead of a continuous rotary motion, to the magnet. These and other variations of construction and operation are regarded as within the scope of the annexed claims, inasmuch as the invention set forth is believed by me to be fundamentally new.

Having thus described my invention, what I claim and desire to secure by Letters Patent of the United States, is:

1. The method of arc welding, which comprises establishing an electric arc to fuse the metal to be welded, diverting the arc away from its normal axis, and rotating the arc to apply its heat in succession to areas of metal within a circle concentric to said axis.

2. In an arc welding apparatus, an electrode arranged in arcing relation to the metal to be welded, magnetic means effective to divert the arc from its normal axis, and means controlling said magnetic means to cause the arc to travel in a predetermined circular path around said axis.

3. In an arc welding apparatus, an electrode arranged in arcing relation to the metal to be welded, a magnet arranged to establish a magnetic field transverse to the arc to divert the same from its normal axis, and means to control the magnetic field to cause the arc to travel in a circular path about said axis.

4. In an arc welding apparatus, an electrode arranged in arcing relation to the metal to be welded, a permanent magnet arranged to establish a magnetic field transverse to the arc to divert the same from its normal axis, and means to rotate said magnet about the arc to effect a rotation of the magnetic field and consequent traveling of the arc in a path concentric to its normal axis.

In testimony whereof, I have signed my name at Milwaukee, this 18th day of January, 1928.

KARL STROBEL.